United States Patent [19]

Cohen

[11] Patent Number: 4,954,074
[45] Date of Patent: Sep. 4, 1990

[54] INJECTION BLADDER PRESS

[75] Inventor: Zachariha Cohen, Cleveland Heights, Ohio

[73] Assignee: US Molding Machinery Company, Mentor, Ohio

[21] Appl. No.: 228,544

[22] Filed: Aug. 4, 1988

[51] Int. Cl.$^5$ ............................................. B29C 45/40
[52] U.S. Cl. ...................................... 425/556; 425/441; 425/443; 425/451.9; 425/590
[58] Field of Search ................. 425/47, 436 R, 441, 425/443, 444, 451, 451.2, 451.9, 547, 552, 556, 590, 38

[56] References Cited

U.S. PATENT DOCUMENTS

| | | | |
|---|---|---|---|
| 2,490,625 | 12/1949 | Hall | 425/590 |
| 3,554,087 | 1/1971 | Florjancic | 425/590 |
| 4,597,729 | 7/1986 | Singh et al. | 425/38 |

FOREIGN PATENT DOCUMENTS 1275067  9/1961  France ........................ 425/590

OTHER PUBLICATIONS

Gleason Reel brochure entitled "New! Series K Hydraulic Dual-Hose Reels Safely and Efficiently Control Hoses on Moving Equipment".
McNeil Akron brochure entitled "Bladder Presses".
McNeil Akron brochure entitled "Bladder Presses and Semi-Bag-O-Matic Shaping Units".

*Primary Examiner*—Jay H. Woo
*Assistant Examiner*—Timothy W. Heitbrink
*Attorney, Agent, or Firm*—Renner, Otto, Boisselle & Sklar

[57] ABSTRACT

An injection bladder press characterized by a bladder mold including an upper mold part, a lower mold part and a mold core; a squeeze piston for squeezing the mold when closed; and an injection unit for injecting rubber molding material into the mold to mold a bladder therein. A flexible hose is connected at one end to the mold core for movement therewith and for delivery of fluid to the mold core, and at its other end to a self-retracting hose reel operative to pay out and retract the flexible hose during movement of the mold core. A top platen is mounted to a top bolster for movement away from the top bolster to facilitate access to the injection nozzle. The mold core actuator is located with a support column depending from a moving bolster. The support column is engaged by a pressure column for transfer of mold clamping force to the moving bolster from the squeeze piston in a bottom bolster.

18 Claims, 4 Drawing Sheets

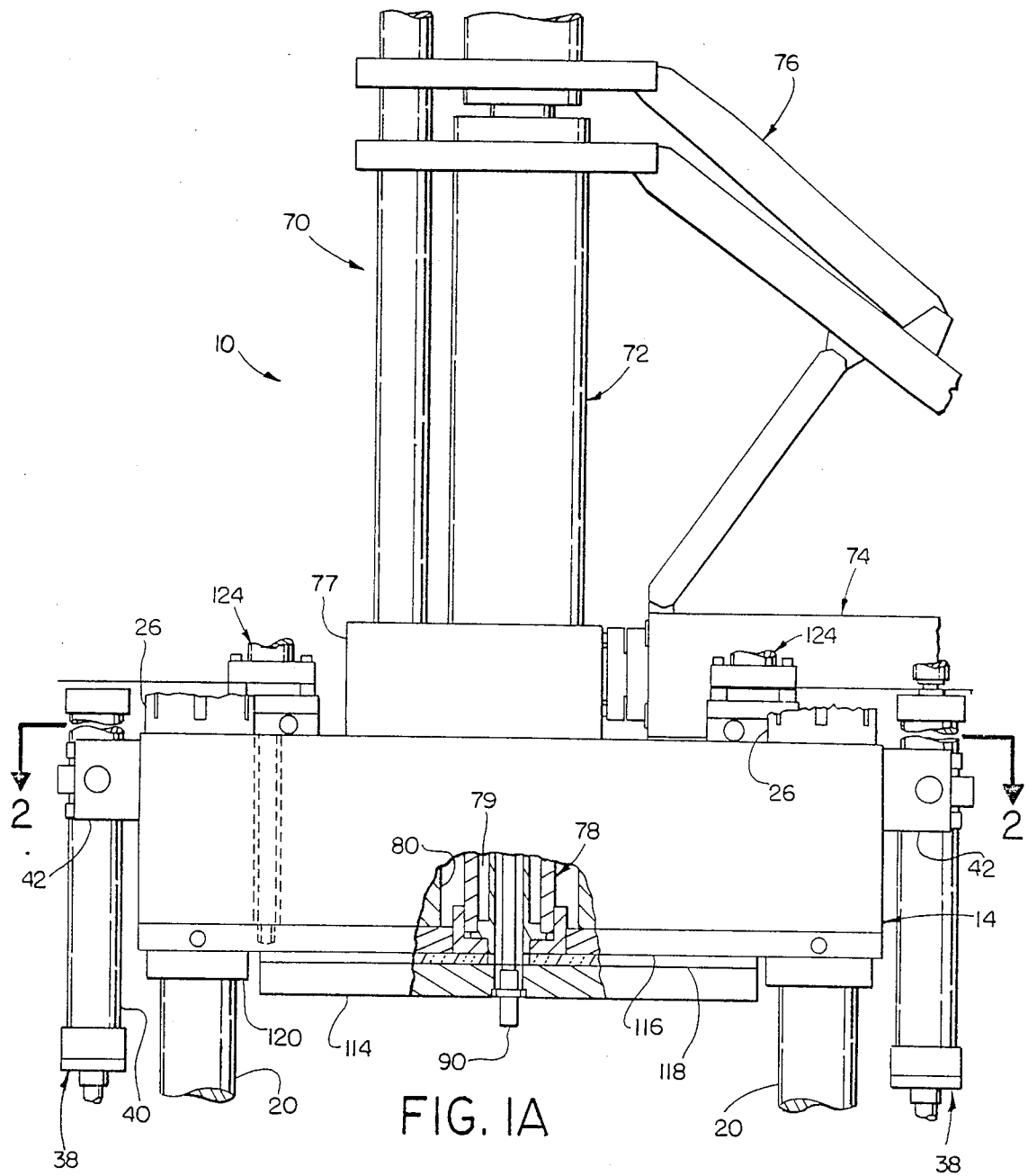
FIG. IA

INJECTION BLADDER PRESS

FIELD OF THE INVENTION

The invention herein described relates generally to a rubber injection molding machine and, more particularly, to a rubber injection bladder press.

BACKGROUND OF THE INVENTION

Bladder presses heretofore have been used to shape and cure tire curing press bladders. These bladders are used in tire curing presses to contain high temperature curing media, typically steam, within the interior of the tire for shaping and curing tires. The bladders generally are cylindrical and have one or both ends open depending on the type of tire curing press in which they are used. Most if not all bladders employed in tire curing presses are made of rubber material.

Present day bladder presses for the most part employ compression molding techniques to mold the bladders. These presses have used a large main ram to apply large closing forces to insure rubber flow into the entire mold cavity formed by upper and lower mold parts and a mold core. The main ram also has been used to perform the opening and closing function of the press. To accomplish this the ram had to have a large stroke and this necessitated large capacity hydraulic supply systems.

The main ram typically would be located in the base or bottom bolster of the press which was connected by tie members such as side plates to an upper bolster or press head. The lower mold part would be secured to a lower platen mounted atop the main ram and the upper mold part would be secured to an upper platen mounted to the underside of the top bolster. The mold core would be secured to a core plate movably mounted to the top bolster so that the mold core could be lowered to strip the cured bladder from the upper mold part and then permit removal of the cured bladder from the mold core. To facilitate removal of the cured bladder from the extended core, the core has been provided with an internal air passage by which pressurized air could be supplied to an interior surface of the bladder to cause the same to expand and, in some instances, blow off the mold core. The air passage terminated at an external fitting to which the operator could connect an air line.

In some bladder presses the core plate was actuated by a double rack and gear mechanism and in other bladder presses by piston-cylinder assemblies. In presses designed to mold bladders open at both ends, there has been provided a core ring which cooperates with the lower mold part to form the lower bead of the bladder. To permit removal of the bladder from the lower mold part the core ring can be raised by a core ring pistoncylinder assembly typically housed within the main ram.

SUMMARY OF THE INVENTION

In contradistinction to prior art bladder presses presently known to applicant, the present invention provides an injection bladder press which has various advantages over conventional compression bladder presses including, inter alia, reduced cure time, improved uniformity of the molded articles, reduced hydraulic system requirements for the main ram, improved reliability, and overall faster and easier operation.

According to one aspect of the invention, a bladder press comprises a bladder mold including an upper mold part, a lower mold part and a mold core; a squeeze piston or the like for squeezing the mold when closed; and an injection unit for injecting rubber molding material into the mold to mold a bladder therein According to a preferred embodiment of bladder press, the lower mold part and mold core are moved relative to the upper mold part to strip the bladder from the upper mold part and the mold core is movable by a mold core actuator relative to the lower mold part to strip the bladder from the lower mold part. For circulating curing or cooling media through the mold core, a flexible hose is connected at one end to the mold core for movement therewith and for delivery of the curing or cooling media to the mold core. At the other end of the flexible hose there is provided a self-retracting hose reel for paying out and retracting the flexible hose during movement of the mold core. According to the preferred embodiment, a top platen to which the upper mold part is secured has an opening for the injection nozzle of the injection unit, and the top platen is mounted to the top bolster for movement away from the top bolster to facilitate access to the injection nozzle.

According to another aspect of the invention, an injection molding press comprises a bottom bolster, a top bolster to which an upper part of a mold is attached, strain rods or the like connecting the top bolster to the bottom bolster, and a moving bolster to which a lower part of the mold is attached. The moving bolster is located between the bottom and top bolster. A first actuator supported by the bottom bolster beneath the moving bolster functions to urge the moving bolster upwardly to squeeze the mold between the top bolster and the moving bolster. A second actuator is operative independently of the first actuator to lower and raise the moving bolster to open and close the mold. The press also includes a mold core support to which a mold core is attached, and the mold core support is movable by a third actuator carried by the moving bolster for raising and lowering the mold core support relative to the moving bolster. As is preferred, the moving bolster has a support column depending therefrom, and a pressure column is movable to a position between the support column and the first actuator for transfer of force from the first actuator to the support column for upward urging of the moving bolster. The third actuator desirably is located in the support column.

According to a further aspect of the invention, a bladder press comprises a bladder mold including an upper mold part, a lower mold part and a mold core; an actuator for moving the mold core relative to the lower mold part to strip the bladder from the lower mold part; a conduit or passage in the mold core for directing pressurized fluid to an interior surface of a bladder molded onto the mold core, and means for supplying pressurized fluid to the conduit in the mold core automatically in response to movement of the mold core to a position elevated with respect to the lower mold part for automatic blow off of the bladder from the mold core.

The foregoing and other features of the invention are hereinafter fully described and particularly pointed out in the claims, the following description and the annexed drawings setting forth in detail a certain illustrated embodiment of the invention, this being indicative, however, of but one of the various ways in which the principles of the invention may be employed.

BRIEF DESCRIPTION OF THE DRAWINGS

In the annexed drawings:

FIGS. 1A and 1B are broken continuations of a fragmentary elevational view, partly broken away in section, of an injection bladder press according to the invention;

DETAILED DESCRIPTION

Figure 1B:
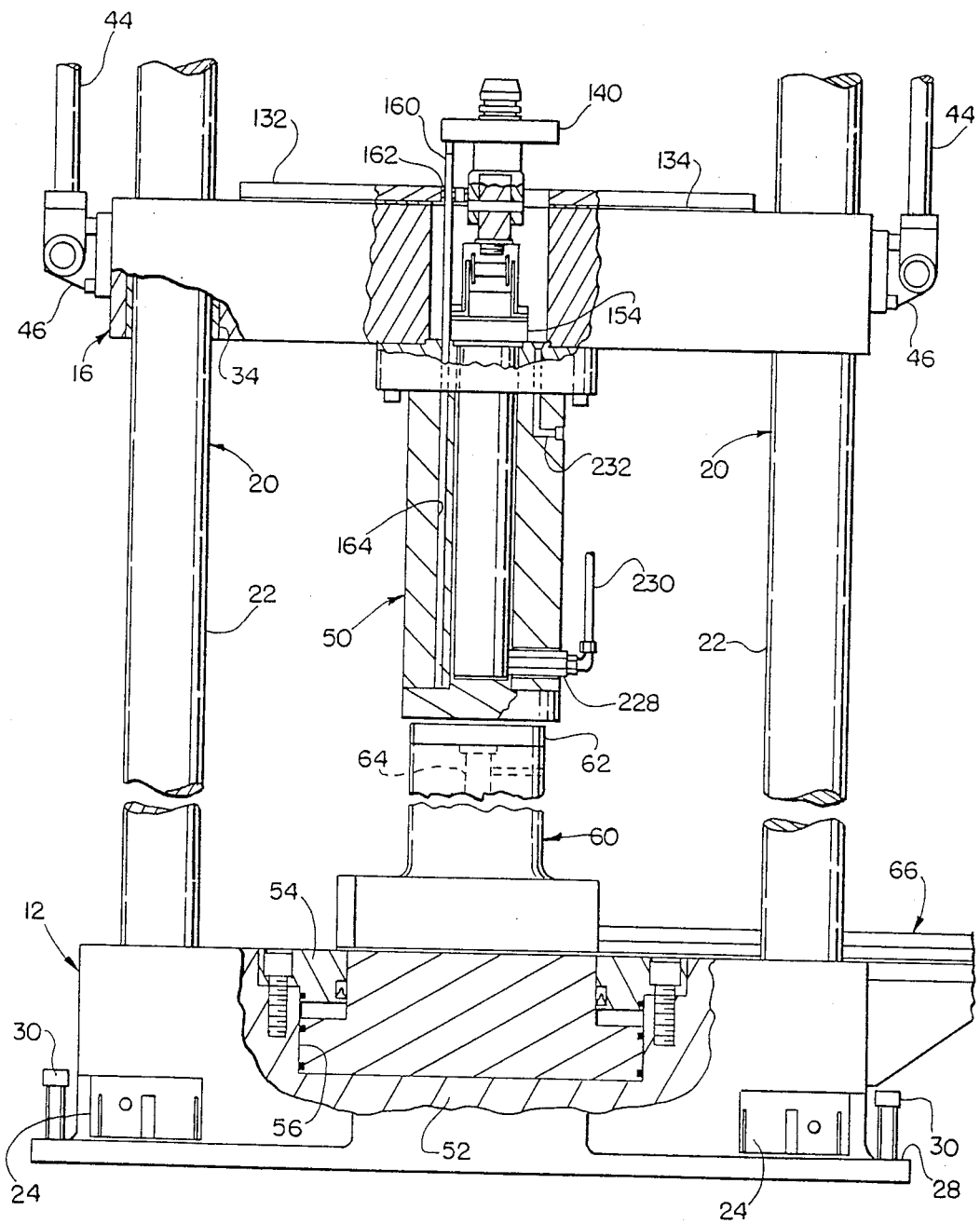

The invention will now be described in detail with reference to the injection bladder press illustrated in the drawings which constitutes a preferred embodiment of the invention. It will be appreciated, however, by those skilled in the art that novel principles of the invention herein described with reference to a preferred embodiment may have application in other injection molding presses and in molding presses in general.

Figure 2:
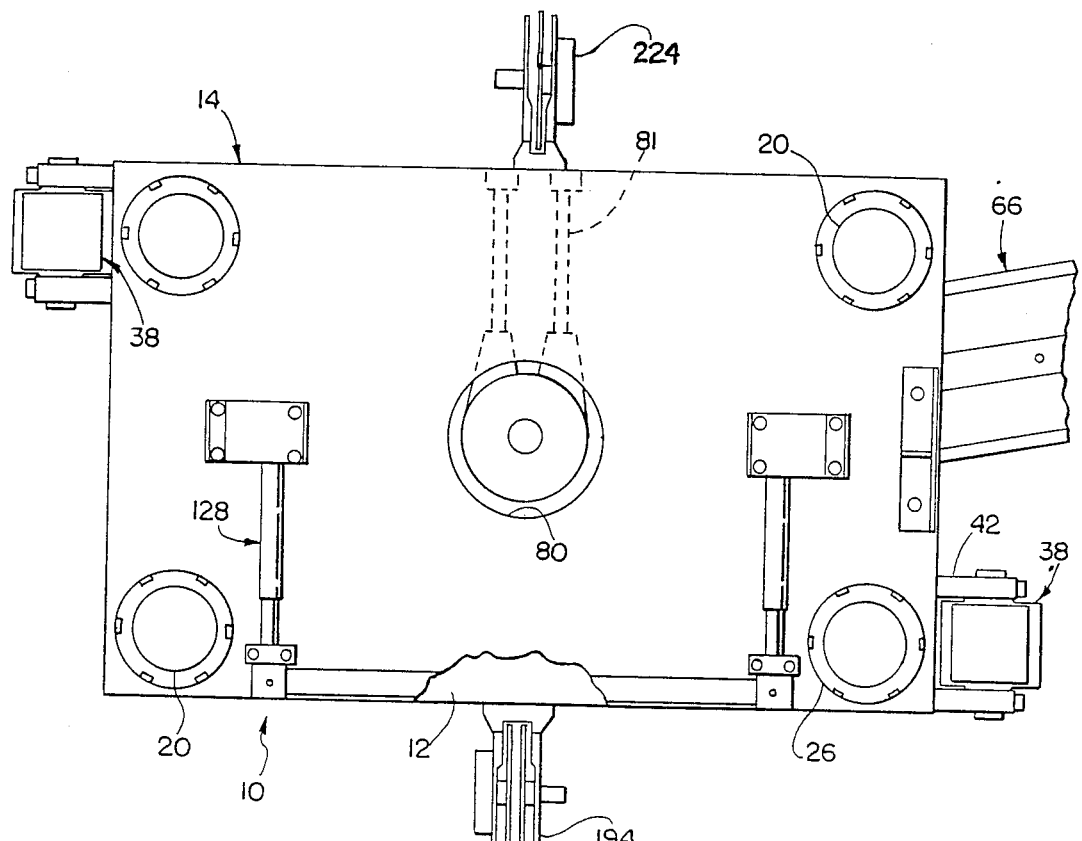
FIG. 2 is a horizontal section through the bladder press of FIG. 1 taken along the line 2—2 of FIG. 1.

Referring initially to FIGS. 1A, 1B and 2, the injection bladder press is indicated generally at 10. The bladder press 10 generally comprises a bottom bolster or base 12, a top bolster or press head 14, and a moving bolster 16 between the bottom and top bolsters. As can be seen, the bolsters are generally in the form of plates.

The bottom bolster 12 and top bolster 14 are fixed against movement with respect to one another by four tie or strain rods 20. The strain rods are located at respective corners of the generally rectangular bolster plates as best seen in FIG. 2. Each strain rod has a slightly enlarged diameter central portion 22 extending between the bottom and top bolsters. This central portion 22 functions as a spacer which supports and spaces the top bolster above the bottom bolster. The reduced diameter lower ends of the strain rods pass through holes in the bottom bolster and are secured to the bottom bolster by large nuts 24. Similarly the reduced diameter upper ends of the strain rods are secured to top bolster by large nuts 26. The bottom bolster at its lower end is formed with a peripheral footer flange 28 for convenient mounting to a floor structure by bolt fasteners 30.

The moving bolster 16 is mounted for vertical movement on the strain rods 20 between the bottom bolster 12 and top bolster 14. The strain rods pass through bushings 34 fitted in holes in the moving bolster, such bushings being located at respective corners of the generally rectangular shape moving bolster plate. The bushings 34 cooperate with the the strain rods to guide vertical movement of the moving bolster between the bottom and top bolsters while also maintaining the moving bolster parallel to the bottom and top bolsters.

The moving bolster 16 is raised and lowered to close and open the press by a pair of secondary clamp piston-cylinder assemblies 38. Each piston-cylinder assembly 38 has is cylinder 40 mounted by a mounting block 42 to the top bolster 14 at a side thereof opposite the other piston-cylinder assembly. The rod 44 of each piston-cylinder assembly 38 is attached by a pivot pin to a clevis 46 secured to the moving bolster. As will be appreciated, extension and retraction of the piston-cylinder assemblies 38 will lower and raise the moving bolster, respectively.

As seen in FIG. 1B, a support column 50 is secured to the underside of the moving bolster 16. The support column is centered with respect to the moving bolster and is vertically (axially) aligned with a large diameter squeeze piston 52. The squeeze piston 52 is retained by a piston retainer 54 in a cylindrical bore 56 in the bottom bolster 12 which thereby functions as the cylinder for the squeeze piston. The squeeze piston has a limited stroke substantially less the distance the moving bolster must move to open and close the press. The squeeze piston may have a maximum stroke of about 1 inch and, as will be seen, an even shorter operative stroke. This greatly minimizes hydraulic supply requirements for effecting high pressure squeeze on a mold during injection of rubber molding material into the mold.

To provide for such reduced stroke of the squeeze piston 52, there is provided a pressure column 60. When the moving bolster 16 is in an elevated or closed position, the pressure column is movable between the support column 50 and squeeze piston 52 as seen in FIG. 1B. When the pressure column is thusly axially aligned with the support column and squeeze piston, high pressure hydraulic fluid may be supplied through porting in the bottom bolster 12 to the bottom side of the squeeze piston to apply the necessary squeeze or clamping force to a mold disposed between the moving bolster 16 and top bolster 14 in the hereinafter described manner.

The pressure column 60 has at its upper end a removable spacer plate 62 that may be replaced with spacer plates of different thicknesses to accommodate molds of different heights. The spacer plates each may have attached thereto a downwardly extending rod 64 which fits in an axial bore in the pressure column to provide for easy and quick exchange of spacer plates. After molding of a bladder, the pressure column is movable to a laterally (horizontally) offset position clear of the support column to permit lowering of the moving bolster.

Perhaps it should be noted that in the illustrated embodiment the pressure column 60 has a length greater than the length of the support column 50, although this is not apparent because only vertically collapsed fragments of the pressure column are illustrated in FIG. 1B. In any event, the lengths of the pressure column and support column may be varied to provide for desired opening movement of the moving bolster as well as for a desired operative stroke of the squeeze piston for a given mold height or range of mold heights. Preferably the clamping or operative stroke of the squeeze piston is made as short as possible such as, for example, less than about 0.250 inch.

The pressure column 60 preferably is horizontally shifted into and out of alignment with the squeeze piston 52 by a hydraulically actuated double rack and gear mechanism which is only partly shown at 66 in FIGS. 1B and 2. Such mechanism has been previously used in injection molding presses manufactured and sold by US Molding Machinery Company of Cleveland, OH, U.S.A. Accordingly, details of such mechanism are known to the art and therefore will not be herein described for the sake of brevity. However, it is noted that in such prior injection molding machines, the pressure column engaged the underside of the moving bolster plate, there being no provision of a support column or the like for accommodating a mold core actuator as taught herein by applicant. In any event, any suitable mechanism may be employed to shift the pressure column or similar member into and out of alignment with the squeeze piston, while still achieving advantages afforded by the present invention.

As further seen in FIG. 1A, the bladder press 10 comprises an injection unit 70. In the illustrated embodiment the injection unit 70 is of a conventional type used to inject rubber into molds. The injection unit is similar to an injection unit previously employed in molding presses manufactured and sold by US Molding Machinery Company of Cleveland, OH, U.S.A. Accordingly, details of such mechanism are known to the art and therefore the injection unit will be only briefly described.

Figure 3:
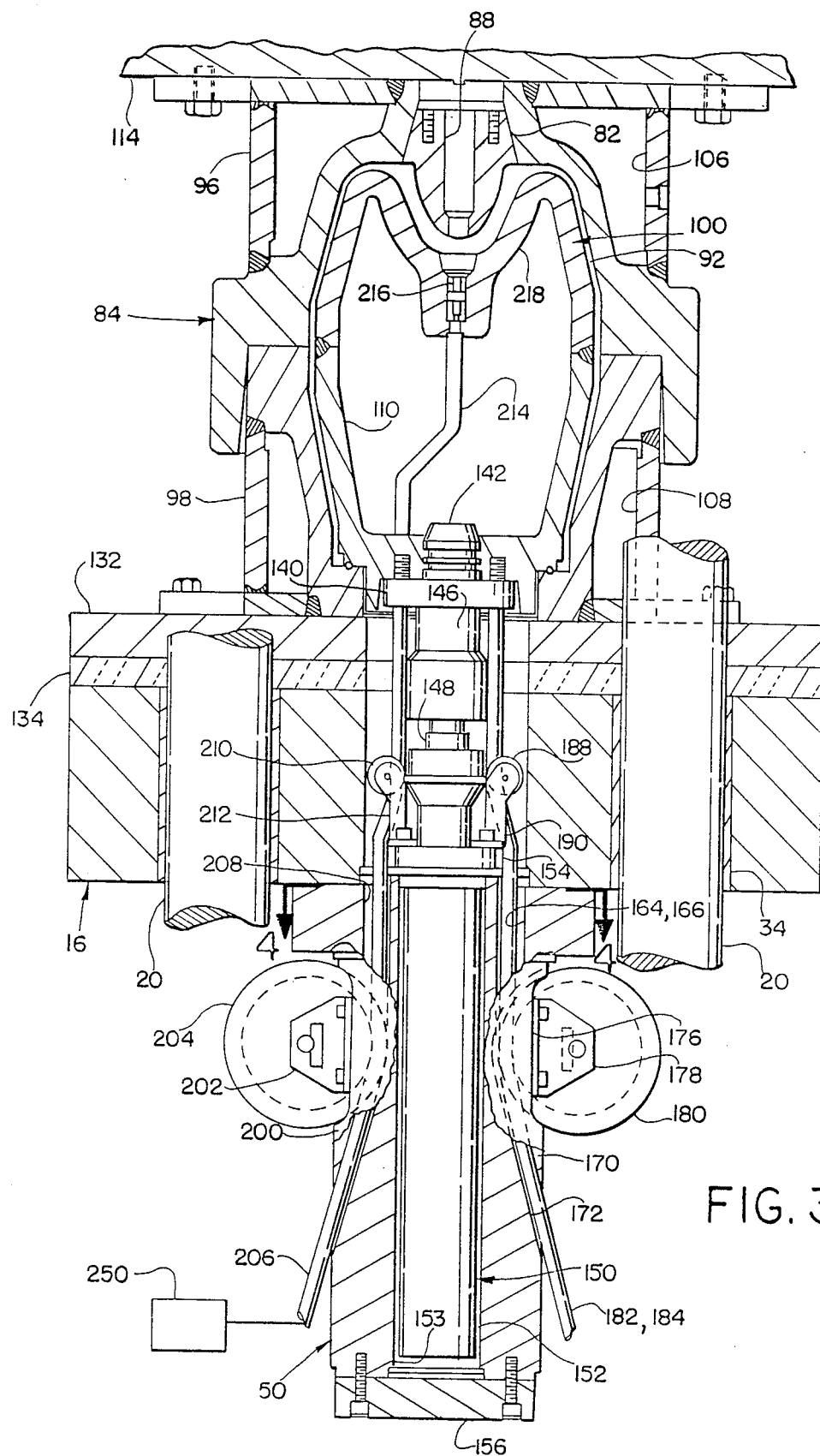
FIG. 3 is a fragmentary enlarged vertical sectional view through the press with a mold installed therein.

The injection unit 70 includes a vertically oriented injector assembly 72 and a horizontally oriented feed screw assembly 74. A linkage mechanism partly shown at 76 is provided so that the feed screw assembly may be swung away from the injector assembly for cleaning and maintenance. The injection unit is mounted at a mounting ring 72 to the top side of the top bolster 14. Below the mounting ring an extended injection nozzle structure 78 passes through a clearance hole 80 in the top bolster for engagement in the nose piece 82 of a bladder mold 84 (FIG. 3). The nozzle structure 78 includes a cooling jacket 79, for controlling the temperature of the injection nozzle structure and the top bolster and has passages 81 for supply and return lines connected to the cooling jacket.

Referring now to FIG. 3, it can be seen that the bladder mold 84 generally may be of a conventional construction. However, in contrast to a conventional compression mold, there is provided a feed passage 88 into which the injection nozzle 90 (FIG. 1A) extends. The feed passage opens to the mold cavity 92. In the illustrated exemplary mold the feed passage 88 is provided in the nose piece 82 which permits injection of rubber molding material generally centrally into the mold cavity.

The bladder mold 84 generally comprises an upper mold part 96, a lower mold part 98 and a mold core 100. The upper mold part has a central opening in which the nose piece 82 is seated. As those skilled in the tire curing press art will readily appreciate, the nose piece has a protruding portion contoured to the shape of a bladder stripping ram employed in a well known press manufactured by NRM Corporation of Columbiana, OH, U.S.A.

The lower mold part 98 also has a central opening which is closed by the base of the mold core 100 when the mold core is retracted into the lower mold part as shown. Both the upper and lower mold parts 96 and 98 include annular interior passages 106 and 108, respectively, for circulation of high temperature curing media such as steam. The mold core also may be provided with an interior passage or passages for high temperature curing media. In the illustrated embodiment the hollow interior 110 forms a passage for the high temperature curing media. The passages may also be use to circulate cooling media to cool the mold as at the end of each curing cycle to prevent overcuring of the rubber bladder.

The upper mold part 96 is secured to the bottom of a top platen 114. As seen in FIG. 1A, the top platen 114 is secured to the bottom of a top platen mounting plate 116 preferably with an insulation plate 118 sandwiched therebetween to minimize the amount of heat that conducts out of the mold to other parts of the bladder press. The top platen mounting plate 116 is guided for vertical movement by the strain rods 20 into and out of abutment with the underside of the top bolster 14. The top mounting plate is fitted with bushings 120 through the strain rods pass.

The top platen mounting plate 116 is lowered and raised by a pair of piston-cylinder assemblies 124. The piston-cylinder assemblies 124 have their cylinders mounted atop the top bolster 14 and their rods connected to locking pins which extend through holes in the top bolster for attachment to the top platen mounting plate.

The piston-cylinder assemblies 124 may be extended to lower the top platen mounting plate 116 away from the top bolster 14 to provide access to the injection nozzle 90 for cleaning or maintenance. Also, in large bladder presses like that illustrated, such lowering positions the mounting plate 116 at a more accessible height to facilitate changing or servicing of the upper mold part. Normally, however, the piston-cylinder assemblies 124 are retracted to bring the top platen mounting plate into abutment with the underside of the top bolster which then provides a rigid support for the top platen and more importantly the upper mold part 96. After the piston-cylinder assemblies 124 have been retracted, the locking pins may in known manner be locked in place by the locking mechanism indicated at 128 in FIG. 2 or by any other suitable mechanism, thereby to hold the top platen mounting plate in its raised position independently of the piston-cylinder assemblies 124, whereupon the latter may be deenergized if desired.

As seen in FIG. 3, the lower mold part 98 is secured to a bottom platen 132. The bottom platen 132 is secured to the moving bolster 16 preferably with an insulation plate 134 sandwiched therebetween to minimize the amount of heat that conducts out of the mold to other parts of the bladder press. The moving bolster provides a rigid support for the bottom platen and more importantly the lower mold part.

The mold core 100 is secured at its base to a core mounting plate 140 which, as shown, may be received in a bottom recess in the mold core base. The core mounting plate has an upwardly protruding plug 142 which closes a central hole in the base of the mold core. The plug is provided with annular grooves for annular seals or packing which seal to the surface of the hole in the base.

The core mounting plate 140 is attached by a core mounting plate adaptor 146 to a piston rod adaptor 148 on the end of the piston of a piston-cylinder assembly 150. The cylinder 152 of the piston-cylinder assembly 150 is for the most part housed within an axially extending hole 153 in the support column 50. At its upper or rod end the cylinder 152 has a mounting block 154 by which it is mounted to the top end of the support column 50 within a center hole 155 in the moving bolster 16. The bottom end of the hole 153 is closed by a cover plate 156 against which the pressure column 60 bears when high pressure squeeze is applied. As can be seen, the support column is in the form of a cylinder having a hollow interior in which the cylinder 152 is located or housed.

As will be appreciated, extension and retraction of the piston-cylinder assembly 150 will, respectively, raise and lower the mold core 100 in relation to the moving bolster 16. In this manner the piston-cylinder assembly 150 functions as an actuator for the mold core. To prevent rotation of the mold core, the core mounting plate 140 has a depending guide rod 160 which slides in a bushing 162 fixed in the bottom platen 132 and in an axially extending guide hole 164 in the support column 50 as seen in FIG. 1B.

Figure 4:
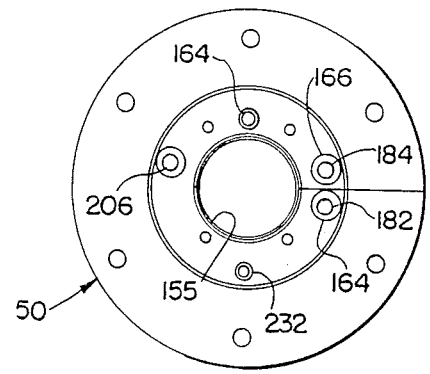
FIG. 4 is a horizontal sectional view taken substantially along the line 4—4 in FIG. 1.

As seen in FIGS. 3 and 4, the support column 50 has a pair of circumferentially adjacent, axially extending holes or apertures 164 and 166 which open to the top surface of the support column radially outwardly of the center hole 155. At their lower ends the holes 164 and 166 open tangentially to a groove 170 in a side of the support column. The groove 170 has a bottom surface 172 including an arcuate upper portion and a sloped lower portion as shown.

The side of the support column 50 in which the groove 170 is formed is provided with flats 176 at each side of the groove. Mounted to the flats are brackets 178 between which a guide roll (or rolls, if desired) 180 is mounted for rotation. Trained over the guide roll 180 between the guide roll and the groove bottom 172 are a pair of hoses (or other suitable flexible conduits) 182 and 184 which function as supply and return lines for curing (or cooling) media circulated through the mold core 100.

The hoses 182 and 184 extend upwardly from the guide roll 180 through respective ones of the holes 164 and 166. The hoses then pass over an idler roll 188 which is mounted between brackets 190 secured to the cylinder mounting block 154. From the idler roll the hoses extend upwardly to and through holes in the core mounting plate 140 for connection to corresponding supply and return ports in the base of the mold core 100.

The hoses 164 and 166 at their ends opposite the mold core are wound onto a self-retracting hose reel or reels. Preferably, the hose reel is of the dual hose, spring motor type for controlling both hoses. Suitable hose reels are available from Gleason Reel of Bayville, WI. A preferred hose reel includes a spring motor which operates to retract the hoses onto storage rolls to take up any slack in the hoses and maintain the hoses taught. On the other hand, the hose reel will pay out the hoses as needed during raising and lower movement of the mold core 100 and also during raising and lowering of the moving bolster 16.

The hose reel, indicated at 194 in FIG. 2, may be mounted at a convenient location on the bottom bolster preferably in coplanar relationship with the guide roll 180. As shown, the hose reel 194 is mounted to the side of the bottom bolster 12, although if desired it may be mounted to the top surface of the bottom bolster. As is known, the dual hose reel has respective fittings for connection to external supply and return lines in known manner.

At its side opposite the guide roll 180, the support column 50 has a similar hose and guide arrangement. A groove 200 is formed in such side of the support column and it is essentially the same the groove 170. The groove 200 is bordered by flats to which brackets 202 are secured. Mounted between the brackets for rotation is a guide roll 204 over which a hose (flexible conduit) 206 is trained, the hose passing between the roll and bottom of the groove. The hose 206 functions as a delivery line for pressurized air to the mold core 100 for facilitating removal of a cured bladder from the mold core in the below described manner.

The air hose 206 extends upwardly from the guide roll 204 through an axially extending hole 208 in the support column 50 which hole intersects the groove 200 substantially tangentially to the radially innermost point of the groove. From the hole 208 the air hose extends upwardly and over an idler roll 210 and then to and through a hole in the core mounting plate 140 for connection to a corresponding port in the base of the mold core 100. The idler roll is mounted between brackets 212 secured to the cylinder mounting block 154.

The port to which the air hose 206 is connected is connected via a hose, tube or other suitable conduit 214 to a check valve 216 provided in an externally opening hole in the mold core end wall 218. The check valve opens to the exterior of the mold core at essentially the center of the mold cavity as is preferred. During molding of a bladder in the mold, the check valve prevents molding material from passing into the air supply hose 214. On the other hand, pressurized air supplied via air hose 206 may exit through the check valve and act upon the interior surface of the molded bladder as is further discussed below.

The air hose 206 at its end opposite the mold core is wound onto a self-retracting hose reel. Like the hose reel 194 for the curing media hoses 182 and 184, the reel for the air hose 206 preferably includes a spring motor which operates to retract the air hose onto a storage roll to take up any slack in the hose and maintain the hose taught. On the other hand, the reel will pay out the hose as needed during raising and lowering movement of the core mounting pipe or the moving bolster 16.

The hose reel, indicated at 224 in FIG. 2, may be mounted at a convenient location on the bottom bolster 12 preferably in coplanar relationship with the guide roll 204. As shown, the hose reel 224 is mounted to the side of the bottom bolster, although if desired it may be mounted to the top surface of the bottom bolster. As is known, the hose reel 224 has a fitting for connection to an external air supply line.

Still other self-retracting hose reels desirably are provided for other supply and/or return lines connected to other moving components of the press. For example, a hydraulic dualhose reel may desirably be provided for hoses connected to the extend and retract ends of the mold core actuator cylinder 152. As seen in FIG. 1B, the blind end of the cylinder 162 is connected via an extension fitting 228 to a hydraulic line 230 to which a flexible hydraulic hose of a hose reel may be attached although not illustrated. The rod end of the cylinder 152 may be connected via a passage 232 in the wall of the support column 50 and a further hydraulic line (not shown) to the other flexible hose of a dual hose reel that may be mounted to the bottom bolster 12.

Turning now to the operation of the bladder press 10, a press cycle may be initiated by closing the mold 84. More particularly, the piston-cylinders assemblies or moving bolster actuators 38 are operated to raise the moving bolster to close the bottom mold part 98 against the top mold part 96. In its closed position, the mold core 100 will be seated in the lower mold part as shown in FIG. 3. After the moving bolster has been brought to its closed position, the pressure column 60 is shifted into alignment with the support column and squeeze piston 52. As will be appreciated, suitable position detectors such as optical sensors or limit switches normally would be provided to facilitate control of the press, such position sensors providing feed back to a timer controlled or computer based controller in conventional manner.

With the pressure column 60 in place, hydraulic fluid is supplied to the bottom of the squeeze piston 52 to apply the desired squeeze or clamping force to the mold 84 clamped between the moving and top bolsters 16 and 14. The squeeze piston and the pressure column 60 supported thereon initially will move upwardly through a short clearance take-up stroke to bring the pressure column into engagement with the support column 50 for transfer of the squeeze force to the mold. With the mold thusly clamped, the injection unit 70 is operated to inject a charge of rubber molding material into the mold to fill the mold cavity 92. As is known in the injection molding art, separation of the mold parts during high pressure injection molding is restricted by the high pressure squeeze applied by the squeeze piston 52. During and/or after the injecting step, high pressure steam or other curing media is circulated through the upper and lower mold parts as well as the mold core to cure the rubber material for a prescribed period of time. After sufficient cure time, cooling media, if desired, may be circulated through the mold parts after which the mold is opened.

To open the mold 84, hydraulic pressure beneath the squeeze piston 52 is relieved to allow the squeeze piston to retract under its own weight and that of the pressure column 60. The pressure column 60 is then shifted clear of the support column 50 after which the moving bolster 16 is lowered to open the press. As the press is opened, the mold core 100 and lower mold part 98 move downwardly to pull or strip the cured bladder from the upper mold part 96. After the cured bladder has been stripped from the upper mold part, the piston-cylinder assembly or core actuator 150 is operated to raise the mold core out of the lower mold part to a position elevated above the lower mold part, during which the cured bladder will be stripped from the lower mold part. When the mold core is in its elevated position air is supplied via air hose 206 to the interior surface of the cured bladder. The air pressure acts upon the interior surface of the cure bladder and causes the same to separate from the mold core. If the pressure is high enough the bladder can be blown off of the mold core.

In the illustrated bladder press, application of pressurized air to the interior surface of the curing bladder is effected automatically, as by a controller diagramatically shown at 250 in FIG. 3, when the mold core is raised to its elevated position, thereby more fully to automate operation of the press.

After the cured bladder has been removed, the mold core may be retracted back into the lower mold part and the press closed for molding of a next bladder.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the following claims.

What is claimed is:

1. An injection molding press comprising a bottom bolster, a top bolster to which an upper part of a mold is attached, means connecting said top bolster to said bottom bolster, a moving bolster to which a lower part of the mold is attached, said moving bolster being located between said bottom and top bolster, first actuator means supported by said bottom bolster beneath said moving bolster for urging said moving bolster upwardly to squeeze the mold parts between said top bolster and said moving bolster, second actuator means operative independently of said first actuator means to lower and raise said moving bolster to open and close the mold, a mold core support to which a mold core is attached, said mold core support being movable relative to said moving bolster, and third actuator means carried by said moving bolster for raising and lowering said mold core support relative to said moving bolster.

2. A press as set forth in claim 1, including flexible conduit means connected at one end to said mold core support for movement therewith and for delivery of a fluid to the mold core attached to said mold core support.

3. A press as set forth in claim 2, including self retracting reel means at an end of said flexible conduit means opposite said one end for paying out and retracting said flexible conduit means during movement of said mold core support.

4. A press as set forth in claim 3, wherein said self retracting means is mounted to said bottom bolster.

5. A press as set forth in claim 2, including a guide for said flexible conduit means intermediate said mold core support and self retracting reel means.

6. A press as set forth in claim 5, wherein said guide includes a guide roller mounted for rotation about an axis fixed with respect to said moving platen.

7. A press as set forth in claim 1, wherein said moving bolster has a support column depending therefrom, and said press including a pressure column movable to a position between said support column and said first actuator means for transfer of force from said first actuator means to said support column for upward urging of said moving bolster.

8. A press as set forth in claim 7, wherein said third actuator means is located in said support column.

9. A press as set forth in claim 1, including a top platen to which the upper mold part is secured, and means for mounting said top platen to said top bolster for movement towards and away from said top bolster.

10. A bladder press comprising a bladder mold including an upper mold part, a lower mold part and a mold core; means for squeezing said mold when closed; injection means for injecting rubber molding material into said mold to mold a bladder therein; means for moving said mold core relative to said lower mold part to strip the bladder from said lower mold part; conduit means in said mold core for directing pressurized fluid to an interior surface of a bladder molded onto said mold core; and means for supplying pressurized fluid to said conduit means in said mold core automatically in response to movement of said mold core to a position elevated with respect to said lower mold part.

11. A bladder press as set forth in claim 10, including means for moving said lower mold part and mold core relative to said upper mold part to strip the bladder from said upper mold part.

12. A bladder press as set forth in claim 10, wherein said means for supplying includes flexible conduit means connected at one end to said mold core for movement therewith and for delivery of said pressurized fluid to the mold core.

13. A bladder press as set forth in claim 12, including self retracting reel means at an end of said flexible conduit means opposite said one end for paying out and retracting said flexible conduit means during movement of said mold core.

14. A bladder press comprising a bladder mold including an upper mold part, a lower mold part and a mold core; means for squeezing said mold when closed; injection means for injecting rubber molding material into said mold to mold a bladder therein; a bottom bolster; a top bolster to which said upper mold part is attached; means connecting said top bolster to said bottom bolster; a moving bolster to which said lower mold part is attached, said moving bolster being located between said bottom and top bolster; first actuator means supported by said bottom bolster beneath said moving bolster for urging said moving bolster upwardly to squeeze said mold between said top bolster and said moving bolster; second actuator means to lower and raise said moving bolster to open and close said mold; a mold core support to which said mold core is attached, said mold core support being movable relative to said moving bolster; and third actuator means carried by said moving bolster for raising and lowering said mold core support relative to said moving bolster.

15. A bladder press as set forth in claim 14, wherein said moving bolster has a support column depending therefrom, and said press including a pressure column movable to a position between said support column and said first actuator means for transfer of force from said first actuator means to said support column for upward urging of said moving bolster.

16. A bladder press as set forth in claim 15, wherein said third actuator means is located in said support column.

17. A bladder press as set forth in claim 14, wherein said injection means has an injection nozzle, and said press including a top platen to which the upper mold part is secured, said top platen having on opening for said injection nozzle, and means for mounting said top platen to said top bolster for movement away from said top bolster to facilitate access to said injection nozzle.

18. A bladder press comprising a bladder mold including an upper mold part, a lower mold part and a mold core; means for moving said mold core relative to said lower mold part to strip the bladder from said lower mold part; conduit means in said mold core for directing pressurized fluid to an interior surface of a bladder molded onto said mold core, and means for supplying pressurized fluid to said conduit means in said mold core automatically in response to movement of said mold core to a position elevated with respect to said lower mold part.

* * * * *